United States Patent [19]

Ohhashi et al.

[11] Patent Number: 4,784,431
[45] Date of Patent: Nov. 15, 1988

[54] AUTOMOBILE ROOF STRUCTURE

[75] Inventors: Hiroshi Ohhashi, Okazaki; Tokuichi Tatsumoto, Toyota, both of Japan

[73] Assignee: Toyota Jidosha Kabushiki Kaisha, Aichi, Japan

[21] Appl. No.: 25,593

[22] Filed: Mar. 13, 1987

[30] Foreign Application Priority Data

Apr. 30, 1986 [JP] Japan ................... 61-100238

[51] Int. Cl.⁴ .................................................. B60J 7/00
[52] U.S. Cl. .................................................. 296/218
[58] Field of Search ............... 296/216, 218, 219, 107, 296/116, 117

[56] References Cited

U.S. PATENT DOCUMENTS

| | | | |
|---|---|---|---|
| 3,476,437 | 11/1969 | Schroeder et al. | 296/219 |
| 3,494,659 | 2/1970 | Trenkler et al. | 296/219 |
| 3,526,427 | 9/1970 | Trenkler et al. | 296/216 |
| 3,610,681 | 10/1971 | Trenkler | 296/218 |
| 4,136,906 | 1/1979 | Ireland et al. | 296/219 |
| 4,249,770 | 2/1981 | Hunt | 296/219 |
| 4,422,686 | 12/1983 | Droz | 296/219 |
| 4,552,401 | 11/1985 | Trenkler | 296/219 |

FOREIGN PATENT DOCUMENTS 60-9730 1/1985 Japan .

Primary Examiner—Robert R. Song
Attorney, Agent, or Firm—Parkhurst & Oliff

[57] ABSTRACT

An automobile roof structure includes a detachable roof section, a front roof section and a fastening device. The front roof section includes a bracket extending from the front roof section. The detachable roof section includes an aperture and is selectively mounted on the bracket. The fastening device includes a guiding member mounted on the bracket, a first engaging member and a second engaging member. The first engaging member of the fastening device is secured to the detachable roof section and is located in the vicinity of the aperture of the detachable roof section. The second engaging member is selectively inserted into both a tapered hole formed in the guiding member and the aperture of the detachable roof section. The second engaging member selectively engages with the first engaging member to position the detachable roof section properly.

20 Claims, 6 Drawing Sheets

AUTOMOBILE ROOF STRUCTURE

BACKGROUND OF THE INVENTION

The present invention relates to an automobile roof structure which includes a detachable roof section and a windshield frame. The detachable roof section is secured selectively to the windshield frame by a simple fastening means. More particularly, the present invention relates to improvements in a fastening means for fastening the detachable roof section to the windshield frame. The simple fastening means of the present invention obviates the installation problems encountered with known devices.

The U.S. Pat. No. 3,610,681 discloses an automobile roof structure which includes a detachable roof section, first and second fastening means for fastening the detachable roof section to a windshield frame and a roll bar.

The first fastening means includes a tension-locking device. The second fastening means includes clamping locks.

However, this conventional automobile roof structure is complex and includes many components.

SUMMARY OF THE INVENTION

The present invention was developed in view of the foregoing background and to overcome the foregoing drawbacks. It is accordingly an object of the present invention to provide an automobile roof structure which includes a detachable roof section and a simple fastening means. Another object of the present invention is the provision of a simple structure for securely fastening the detachable roof section to a fixed roof section of a vehicle.

The automobile roof structure of the present invention includes a detachable roof section, a fixed roof section and a fastening means.

The fixed roof section includes a bracket extending from the fixed roof section.

The detachable roof section is selectively mounted on the bracket of the fixed roof section. The detachable roof section includes an aperture.

The fastening means includes guiding means, a first engaging member and a second engaging member.

The guiding means is mounted on the bracket of the fixed roof section and the guiding means includes a tapered hole therewithin. The tapered hole includes an upper edge and a lower edge. The inner diameter of the lower edge is greater than the inner diameter of the upper edge.

The first engaging means is secured to the detachable roof section and is located in the vicinity of the aperture of the detachable roof section.

The second engaging member is selectively inserted into the tapered hole of the guiding means and the aperture of the detachable roof section. The second engaging member includes an engaging partion and a tapered surface and selectively engages with the first engaging member. The tapered surface includes a first outer diameter located in the vicinity of the engaging portion and a second outer diameter located apart from the engaging portion. The first outer diameter is less than the second outer diameter.

Accordingly, even when a center line of the tapered hole of the guiding means is not aligned with a center line of the aperture of the detachable roof section, the second engaging member biases the detachable roof section toward the proper position by threading the second engaging member into the first engaging member.

BRIEF DESCRIPTION OF THE DRAWINGS

The above objects, features and advantages of the present invention will become more apparent from the description of the invention which follows, taken in conjunction with the accompanying drawings, wherein like reference numerals denote like elements.

DETAILED DESCRIPTION OF THE PREFERRED EMBODIMENTS

The present invention will be described in detail with reference to the accompanying drawings which illustrate preferred different embodiments according to the present invention.

Figure 1:
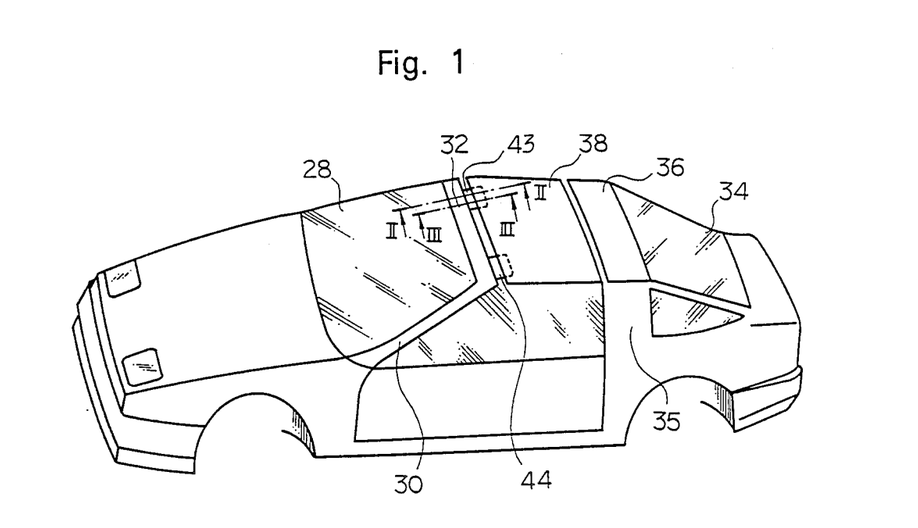
FIG. 1 is a perspective view of a vehicle including a first fastening means according to the present invention.

Referring to FIG. 1, a vehicle includes a windshield 28, a front pillar 30, a front roof section 32, a detachable roof section 38, a rear roof section 36, a center pillar 35 and a rear window 34. The front pillar 30 is connected and secured to the front roof section 32. The front pillar 30 and the front roof section 32 surround the windshield 28 (i.e., the front pillar 30 and the front roof section 32 constitute a windshield frame). The rear roof section 36 is connected to the center pillar 35. The rear roof section 36 and the center pillar 35 constitute a roll bar.

The detachable roof section 38 is positioned between the front roof section 32 and the rear roof section 36, and the detachable roof section 38 covers a passenger compartment. The detachable roof section 38 includes front and rear portions.

Figure 2:
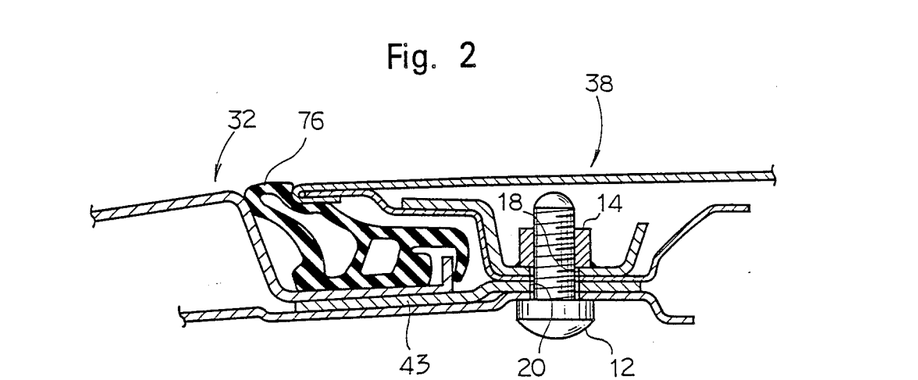
FIG. 2 is a cross-sectional view of the first fastening means taken along the line II—II in FIG. 1, wherein a detachable roof section is positioned properly, and the detachable roof section is secured to a front roof section by a first bolt.
Figure 3:
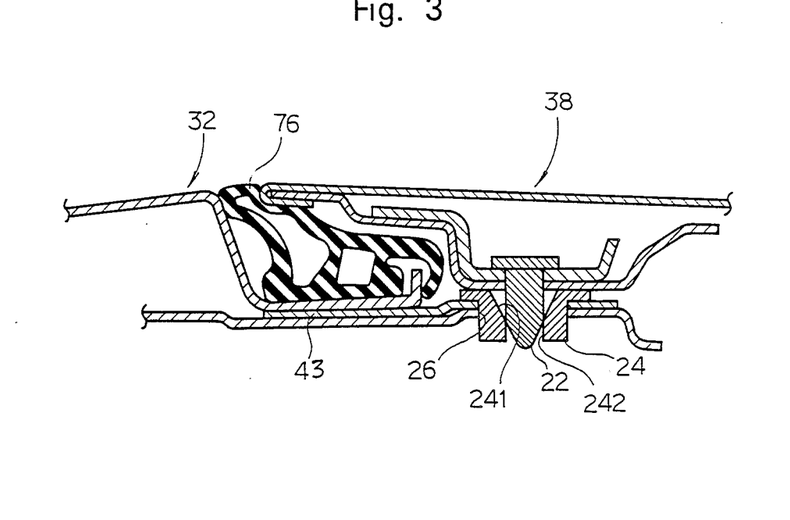
FIG. 3 is a cross-sectional view of the first fastening means taken along the line III—III in FIG. 1, wherein the detachable roof section is positioned properly.

As shown in FIGS. 2 and 3, the front portion of the detachable roof sectiion 38 is selectively mounted on the front roof section 32, and the detachable roof section 38 is selectively secured to the front roof section 32. The front portion of the detachable roof section 38 includes a plurality of first holes 18 and a plurality of projections 22. The first hole 18 is located apart from the projection 22 in the lateral direction of the vehicle. A nut 14 is secured to the front portion of the detachable roof section 38. A center line of the nut 14 corresponds to a center line of the first hole 18 of the detachable roof section 38.

The front roof section 32 includes a plurality of brackets 43 which project rearwardly in the longitudinal direction of the vehicle. Each bracket 43 includes second and third holes 20 and 26 therewithin. The second hole 20 of each bracket 43 corresponds to the first hole 18 of the detachable roof section 38. In a normal condition, the third hole 26 of the bracket 44 corresponds to the projection 22 of the detachable roof section 38. A guiding member 24 is inserted into the third hole 26. The guiding member 24 includes a guiding surface 241 and a positioning hole 242.

The first holes 18, the nuts 14 and the projections 22 of the detachable roof section 38, the second holes 20 and the guiding members 24 of the front roof section 32 and the bolts 12 constitute a first fastening means.

In a normal securing condition, as shown in FIGS. 2 and 3, a bolt 12 is inserted into the second and first holes 20 and 18, and the bolt 12 engages with the nut 14. Simultaneously, the projection 22 is positioned within the positioning hole 242. Accordingly, the detachable roof section 38 and the front roof section 32 form a substantially flush surface, and a space defined between the detachable roof section 38 and the front roof section 32 is effectively sealed by a weather strip 76.

Figure 4:
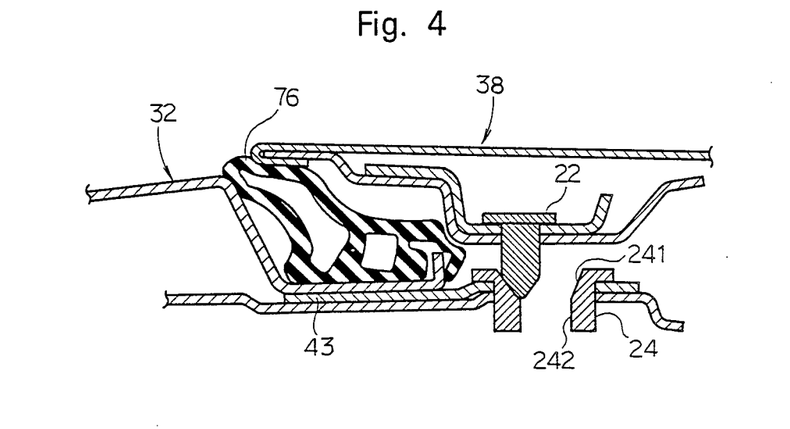
FIG. 4 is a cross-sectional view of the first fastening means taken along the line III—III in FIG. 1, wherein the detachable roof section is not positioned propoerly.

However, when due to manufacturing error, the projection 22 of the detachable roof section 38 is not aligned with the positioning hole 242 of the guiding member 24, the projection 22 of the detachable roof section 38 is located on the guiding surface 241 of the guiding member 24. Accordingly, the detachable roof section 38 projects from the front roof section 32, and sealing effect between the detachable roof section 38 and the front roof section 32 is deteriorated.

Thus, in order to prevent the detachable roof section 38 from projecting from the front roof section 32, a first distance, defined between the projection 22 and the first hole 18 of the detachable roof section 38, must be the same as a second distance defined between the second hole 20 of the front roof section 32 and the positioning hole 242 of the guiding member 24.

However, when due to manufacturing error, the first distance is not the same as the second distance, the detachable roof section 38 might not be secured to the front roof section 32 or the sealing effect between the detachable roof section 38 and the front roof section 32 might be deteriorated.

Figure 5:
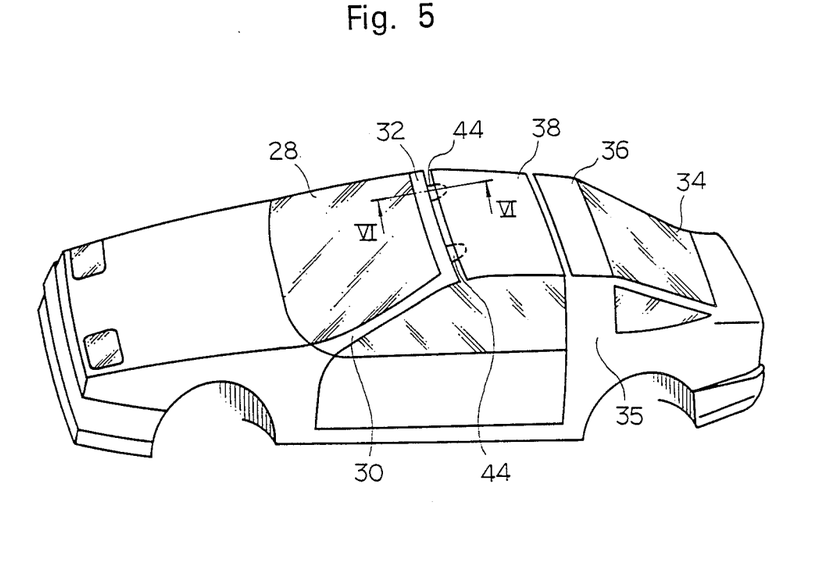
FIG. 5 is a perspective view of a vehicle including second fastening means according to the present invention.
Figure 6:
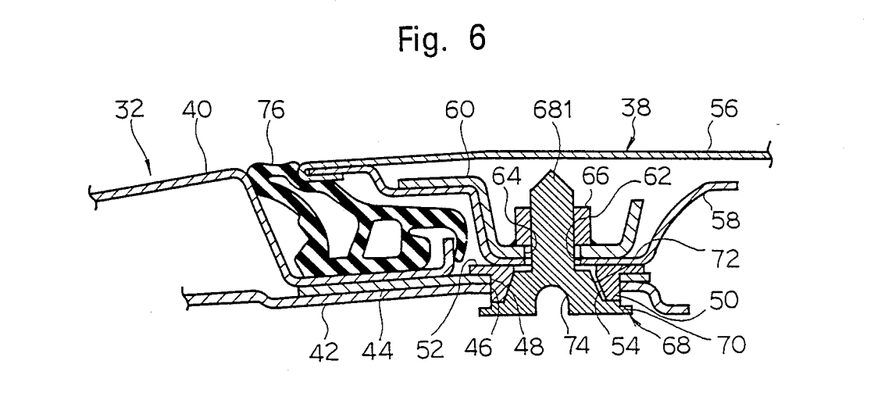
FIG. 6 is a cross-sectional view of the second fastening means taken along the line VI—VI in FIG. 5, wherein the detachable roof section is positioned properly and the detachable roof section is secured to the front roof section by a second bolt according to the present invention.
Figure 7:
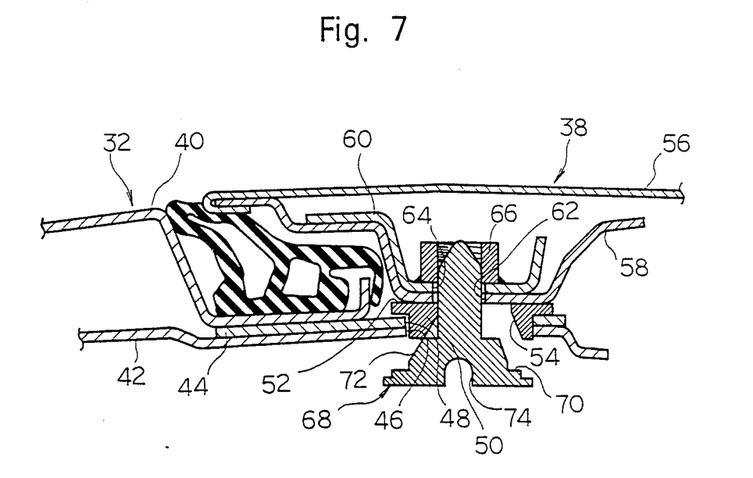
FIG. 7 is a cross-sectional view of the second fastening means taken along the line VI-VI in FIG. 5, wherein the detachable roof section is not positioned properly.

FIGS. 5 through 7 show a second fastening means, provided between the detachable roof section 38 and the front roof section 32, according to the present invention.

As shown in FIG. 6, the second fastening means includes guiding means 50 and a second bolt 68. The guiding means 50 is inserted into a fourth hole 46 defined within a pillar inner panel 42 and a fifth hole 48 defined within a bracket 44. The guiding means 50 includes a flange 52 secured to the bracket 44 by welding. The guiding means 50 includes a tapered hole 54 (i.e., the inner diameter of the lower edge of tapered hole 54 is larger than the inner diameter of the upper edge of tapered hole 54) and the tapered hole 54 includes a smooth surface thereon. A front portion of the bracket 44 is sandwiched between and secured to the pillar inner panel 42 and a roof header outer panel 40. The pillar inner panel 42 is connected to the front pillar 30. The roof header outer panel 40 constitutes a rear portion of the front roof section 32. A weather strip 76 is mounted on a rear portion of the roof header outer panel 40. The bracket 44 extends rearwardly in the longitudinal direction of the vehicle. The bracket 44 is located vertically below an outer surface of the front roof section 32.

The detachable roof section 38 includes a roof outer panel 56 and a roof inner panel 58.

A front edge of the roof outer panel 56 is secured to a front edge of the roof inner panel 58. The weather strip 76 is sandwiched between the roof header outer panel 40 and the front edge of the roof outer panel 56, as a result, a space defined between the roof header outer panel 40 and the front edge of the roof outer panel 56, is effectively sealed.

A portion of the roof inner panel 58 projects downwardly and includes a sixth hole 62. A reinforcement 60 is secured to the projecting portion of the roof inner panel 58, and includes a seventh hole 64 corresponding to the sixth hole 62 of the roof inner panel 58. A nut 66 is welded on the reinforcement 60, and the nut 66 includes a threaded hole. The nut 66 functions as a first engaging member. The center line of the threaded hole of the nut 66 is the substantially aligned with the center line of the sixth hole 62 of the roof inner panel 58.

The second bolt 68 of the second fastening means includes a threaded portion 681 and a head portion 68. The head portion 68 includes a smooth tapered surface 72, a flange 70 and a recess 74. The second bolt 68 functions as a second engaging member. The tapered surface 72 includes a small diameter edge and a large diameter edge. The outer diameter of the small diameter edge of the tapered surface 72 of the second bolt 68 is smaller than the outer diameter of the upper edge of the tapered hole 54 of the guiding means 50. The outer diameter of the large diameter edge of the tapered surface 72 of the second bolt 68 is smaller than the inner diameter of the lower edge of the tapered hole 54 of the guiding means 50. The small diameter edge of the tapered surface 72 is located in the vicinity of the threaded portion 681 of the second bolt 68. The large diameter edge of the tapered surface 72 is located apart from the threaded portion 681. The flange 70 extends outwardly and is located in the vicinity of the large diameter portion.

When the threaded portion 681 of the second bolt 68 engages with and is threaded into the threaded hole of the nut 66, the guiding means 50 is clamped between the flange 70 of the second bolt 68 and the projecting portion of the roof inner panel 58. In this condition, a portion of the tapered surface 72 of the second bolt 68 is not in contact with a portion of the tapered hole 54 of the guiding means 50. A recess 74 is defined within the head portion 68, and when the second bolt 68 is to be threaded into or out of the nut 66, a coin or a screw driver is inserted into the recess 74.

The process of fastening the detachable roof section 38 to the front roof section 32 is disclosed hereinafter.

First, the detachable roof section 38 is mounted on the front and rear roof sections 32 and 36 of the vehicle.

As shown in FIG. 7, when the detachable roof section 38 is not positioned properly, the center line of the guiding means 50 is located apart from the center line of the second bolt 68 and consequently misaligned with respect to the center line or longitudinal axis of the nut 66.

However, when the second bolt 68 is threaded into the nut the tapered surface 72 of the second bolt 68 contacts with the tapered hole 54 of the guiding means 50.

As a result, the second bolt 68 forces the nut 66 and, correspondingly, the detachable roof section 38 to move toward their proper positions.

Therefore, the detachable roof section 38 is positioned properly and the space defined between the front edge of the detachable roof section 38 and the front roof section 32, is securely sealed.

Figure 8:
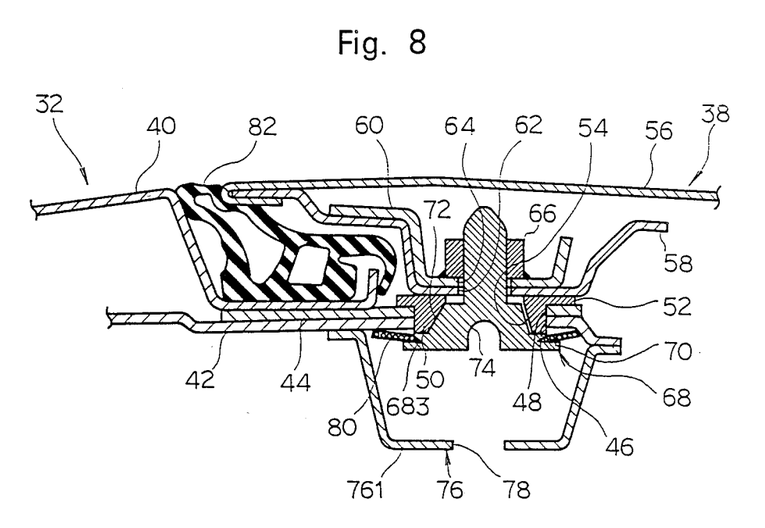
FIG. 8 is a cross-sectional view of a second embodiment of the second fastening means taken along the line VI—VI in FIG. 5, wherein the detachable roof section is positioned properly, and the detachable roof section is secured to the front roof section by the second bolt.
Figure 9:
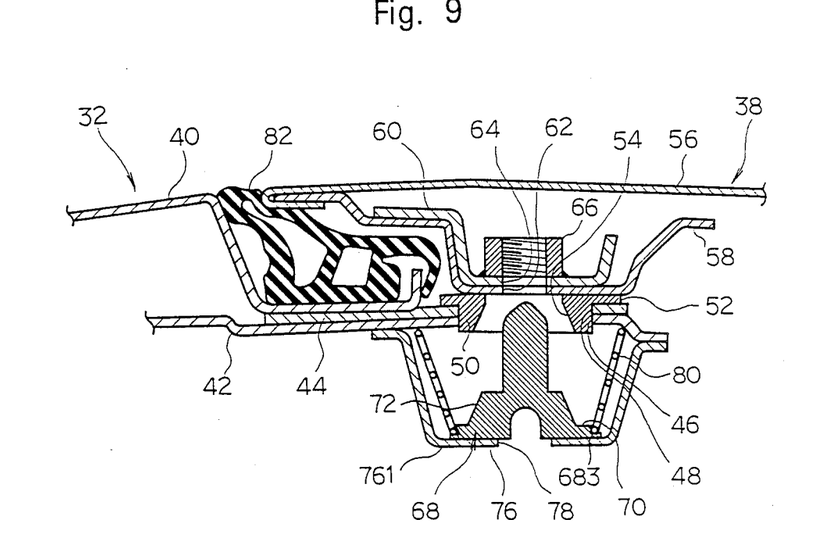
FIG. 9 is a cross-sectional view of the second embodiment taken along the line VI—VI in FIG. 5, wherein the second bolt is biased toward a bottom flange of an under cover.

FIGS. 8 and 9 show a second embodiment of the second fastening means provided between the detachable roof section 38 and the front roof section 32.

The second embodiment is of the second fastening means is substantially similar to the first embodiment of the second fastening means shown in FIGS. 5 through 7.

However, the second embodiment includes an under cover 76 and holding means 80. The under cover 76 is secured to a lower surface of the pillar inner panel 42. The under cover 76 includes a bottom flange 761 and an aperture 78 defined within the bottom flange 761. The center line of the aperture 78 corresponds to the center line of the tapered hole 54 of the guiding means 50. The aperture 78 has a smaller inner diameter than the inner diameter of the upper edge of the tapered hole 54.

Accordingly, even when the second bolt 68 is not engaged with the nut 66, the second bolt 68 can not drop out from the under cover 76.

Further, the holding means 80 is preferably a conical spring. One end of the conical spring 80 is fixed to the lower surface of the pillar inner panel 42 and the other end of the conical spring 80 is inserted into and secured to a V-shape groove 683 defined within the flange 70 of the second bolt 68. As shown in FIG. 9, the conical spring 80 biases the second bolt 68 toward the bottom flanges 761 of the under cover 76. Furthermore, the entire flange 70 of the second bolt 68 is biased uniformly downwardly by the conical spring 80.

Accordingly, even when the second bolt 68 is not engaged with the nut 66, the second bolt 68 does not move in the under cover 76. As a result, the second bolt 68 does not make any noise in the under cover 76.

Further, the conical spring 80 maintains the position of the second bolt 68 within the under cover 76. Thus, the second bolt 68 remains aligned with the nut 66, so that it is very easy for an operator to make the second bolt 68 engage with the nut 66 of the detachable roof section 38.

Moreover, the second bolt 68 is covered by the under cover 76, so that the appearance is improved.

Figure 10:
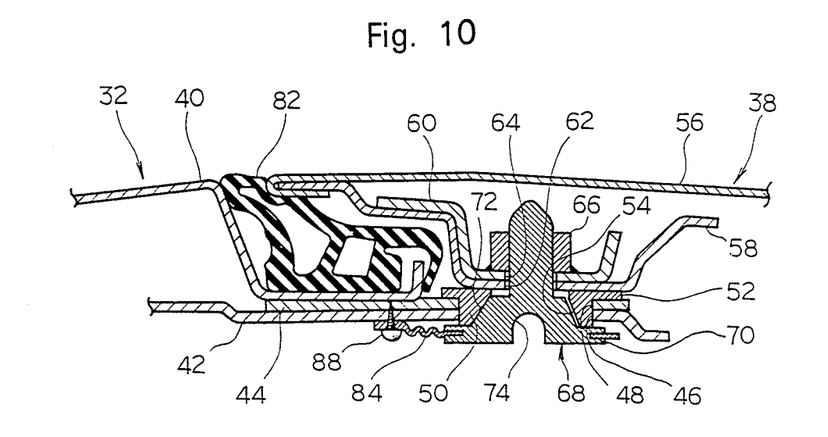
FIG. 10 is a cross-sectional view of a third embodiment of the second fastening means taken along the line VI—VI in FIG. 5, wherein the detachable roof section is positioned properly, and the detachable roof section is secured to the front roof section by the second bolt.
Figure 11:
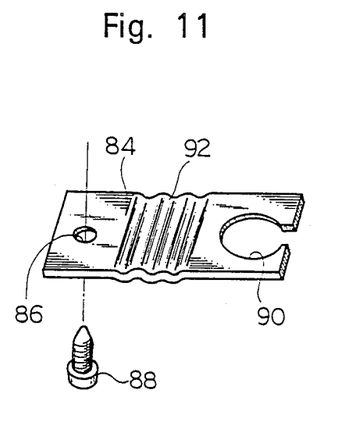
FIG. 11 is a perspective view of a holding means of the third embodiment.

FIGS. 10 and 11 show a third embodiment of the second fastening means. The third embodiment is substantially similar to the second embodiment shown in FIGS. 8 and 9.

However, the third embodiment uses a plate spring 84 as the holding means, instead of the conical spring 80 of the second embodiment.

As shown in FIG. 11, the plate spring 84 includes an aperture 86, an engagement recess 90 and a corrugated portion 92.

As shown in FIG. 10, the plate spring 84 is secured to the pillar inner panel 42 by a screw 88. The second bolt 68 is inserted into and engaged with an engagement recess 90 of the plate spring 84. The corrugated portion 92 of the plate spring 84 allows the second bolt 68 to move in the vertical and longitudinal direction of the vehicle.

As described herein, the present invention overcomes the shortcomings of the known art by providing an automobile roof structure which includes a detachable roof section, a fixed roof section and fastening means including guide means, a first engaging member and a second engaging member.

While the present invention has been described in its preferred embodiments, it is to be understood that the invention is not limited thereto, and may be otherwise embodied within the scope of the following claims.

What is claimed is:

1. An automobile roof structure comprising:
   a fixed roof section;
   a bracket extending from said fixed roof section;
   a detachable roof section selectively mounted on the bracket, said detachable roof section having an aperture;
   fastening means comprising guiding means, a first engaging member and a second engaging member;
   the guiding means mounted on the bracket of said fixed roof section, said guiding means having a tapered hole therewithin, the tapered hole having an upper edge having an inner diameter and a lower edge having an inner diameter, the inner diameter of the lower edge being greater than the inner diameter of the upper edge;
   said first engaging member located adjacent the aperture of said detachable roof section; and
   said second engaging member being selectively inserted into the tapered hole of the guide means and the aperture of the detachable roof section, the second engaging member having an engaging portion and a tapered surface, the engaging portion of the second engaging member selectively engaging with the first engaging member, the tapered surface having a first outer diameter and a second outer diameter, the first outer being less than the second outer diameter, the first outer diameter being located adjacent the engaging portion, the second outer diameter located apart from the engaging portion;
   whereby when a center line of the tapered hole of the guiding means is not aligned with a center line of the aperture of the detachable roof section, the second engaging member forces the detachable roof section to move toward a proper position upon threading of the second engaging member into the first engaging member.

2. The automobile roof structure of claim 1, wherein the lower edge of the guiding means is located vertically below the upper edge of the guide means.

3. The automobile roof structure of claim 1, wherein the tapered hole of the guiding means includes a smooth inner surface.

4. The automobile roof structure of claim 1, wherein the tapered surface of the second engaging member includes a smooth outer surface.

5. The automobile roof structure of claim 1, wherein the second engaging member further includes a flange, the tapered surface of the second engaging member being located adjacent the engaging portion, and said flange being located apart from the engaging portion.

6. The automobile roof structure of claim 5, wherein the flange extends outwardly from the second engaging member.

7. The automobile roof structure of claim 1, wherein the first outer diameter of the second engaging member is less than the inner diameter of the upper edge of the guiding means, and the second outer diameter of the second engaging member is less than the inner diameter of the lower edge of the guiding means.

8. An automobile roof structure comprising:
a fixed roof section;
a bracket secured to the edge of said fixed roof section, the bracket extending in the longitudinal direction of the vehicle;
a detachable roof section selectively mounted on the bracket, said detachable roof section having an aperture, said aperture corresponding to the bracket of said fixed roof section;
guiding means mounted on the bracket of said fixed roof section, said guiding means having a tapered hole therewithin, the tapered hole having an upper edge having an inner diameter and a lower edge having an inner diameter, the inner diameter of the lower edge being greater than the inner diameter of the upper edge;
a first engaging member located adjacent the aperture of said detachable roof section; and
a second engaging member being selectively inserted into the tapered hole of said guide means and the aperture of said detachable roof section, said second engaging member having an engaging portion and a tapered surface, the engaging portion of said second engaging member selectively engaging with said first engaging member, the tapered surface having a first outer diameter and a second outer diameter, the first outer diameter being less than the second outer diameter, the first outer diameter being located adjacent the engaging portion, the second outer diameter located apart from the engaging portion;
whereby when a center line of the tapered hole of said guiding means is not aligned with a center line of the aperture of said detachable roof section, said second engaging member forces the detachable roof section to move toward a proper position upon threading of the second engaging member into the first engaging member.

9. The automobile roof structure of claim 8, wherein the lower edge of the guiding means is located vertically below the upper edge of the guide means.

10. The automobile roof structure of claim 9, wherein the tapered hole of the guiding means includes a smooth inner surface.

11. The automobile roof structure of claim 10, wherein the tapered surface of the second engaging member includes a smooth outer surface.

12. The automobile roof structure of claim 11, wherein the second engaging member further includes a flange, the tapered surface of the second engaging member being located adjacent the engaging portion, and said flange being located apart from the engaging portion.

13. The automobile roof structure of claim 12, wherein the flange extends outwardly from the second engaging member.

14. The automobile roof structure of claim 13, wherein the first outer diameter of the second engaging member is less than the inner diameter of the upper edge of the guiding means, and the second outer diameter of the second engaging member is less than the inner diameter of the lower edge of the guiding means.

15. An automobile roof structure comprising:
a front roof section;
a bracket extending rearwardly from said front roof section in the longitudinal direction of the vehicle;
a detachable roof section selectively mounted on the bracket, said detachable roof section having an aperture; and
a fastening means comprising guiding means, a nut and a bolt;
said guiding means being mounted on the bracket of said front roof section and the guiding means having a tapered hole therewithin, the tapered hole having an upper edge having an inner diameter and a lower edge having an inner diameter, the inner diameter of the lower edge being greater than the upper inner diameter of the upper edge;
said nut corresponding to the aperture of said detachable roof section;
said bolt being selectively inserted into the tapered hole of the guide means and the aperture of the detachable roof section, the bolt having an engaging portion and a tapered surface, the engaging portion of the bolt selectively engaging with the nut, the tapered surface having a first outer diameter and a second outer diameter, the first outer diameter being less than the second outer diameter, the first outer diameter being located adjacent the engaging portion, the second outer diameter located apart from the engaging portion;
whereby when a center line of the tapered hole of the guiding means is not aligned with a center line of the aperture of the detachable roof section, the bolt member forces the detachable roof section to move toward a proper position upon threading of the bolt into the nut.

16. The automobile roof structure of claim 15, wherein the lower edge of the guiding means is located vertically below the upper edge of the guide means.

17. The automobile roof structure of claim 15, wherein the tapered hole of the guiding means includes a smooth inner surface.

18. The automobile roof structure of claim 15, wherein the tapered surface of the bolt includes a smooth outer surface.

19. An automobile roof structure of claim 15, wherein the bolt further includes a flange, the tapered surface of the bolt being located adjacent the engaging portion, and said flange being located apart from the engaging portion.

20. The automobile roof structure of claim 19, wherein the flange extends outwardly from the bolt.

* * * * *